No. 759,716. Patented May 10, 1904.

UNITED STATES PATENT OFFICE.

PAUL JULIUS, OF LUDWIGSHAFEN - ON - THE - RHINE, AND SIEGFRIED HAECKEL, OF MANNHEIM, GERMANY, ASSIGNORS TO BADISCHE ANILIN UND SODA FABRIK, OF LUDWIGSHAFEN-ON-THE-RHINE, GERMANY, A CORPORATION OF BADEN.

RED AZO DYE.

SPECIFICATION forming part of Letters Patent No. 759,716, dated May 10, 1904.

Application filed February 25, 1904. Serial No. 195,295. (No specimens.)

*To all whom it may concern:*

Be it known that we, PAUL JULIUS, a subject of the Emperor of Austria-Hungary, residing at Ludwigshafen-on-the-Rhine, in the Kingdom of Bavaria, and SIEGFRIED HAECKEL, a subject of the King of Prussia, German Emperor, residing at Mannheim, in the Grand Duchy of Baden, Germany, both doctors of philosophy and chemists, have invented new and useful Improvements in Azo Coloring-Matter, of which the following is a specification.

Our invention relates to the production of a new azo coloring-matter which is specially suitable for use in the form of its lakes.

The material from which we obtain our new azo coloring-matter is ortho-chlor-para-toluidin monosulfo-acid, which can easily be obtained by the sulfonation of ortho-chlor-para-toluidin. The sulfo-acid is new; but most probably the sulfo group occupies the ortho position to the amido group,

$(CH_3:NH_2:Cl:SO_3H = 1:4:2:5.)$

This sulfo-acid when acted on by nitrous acid yields a diazo compound which is difficultly soluble in water and when combined with beta-naphthol yields a red azo coloring-matter.

Since the sulfo-acid is new, we give for the sake of convenience an example showing how it may be prepared. The parts are by weight.

*Example 1—Preparation of ortho-chlor-para-toluidin-sulfo-acid.*—Grind one hundred and ninety and a half (190.5) parts of pure ortho-chlor-para-toluidin sulfate (or an equivalent quantity of the commercial product) with fifty-one and one-quarter (51.25) parts of sulfuric acid (containing ninety-eight per cent. of $H_2SO_4$) and heat the resulting powder in an oven in such a manner that the temperature rises within six (6) hours to one hundred and seventy degrees centigrade (170° C.) and continue heating for a further seven (7) hours at a temperature of between one hundred and seventy and one hundred and eighty-five degrees centigrade, (170°–185° C.) The resulting product contains the sulfo-acid and can be used directly for the preparation of the azo compound.

The following example, showing how the azo coloring-matter may be produced, will help to further illustrate our invention; but we do not limit our invention to this example. The parts are by weight.

*Example 2—Preparation of azo coloring-matter.*—Diazotize in the usual manner a quantity of the powder obtained according to Example 1, which contains two hundred and twenty-one and a half (221.5) parts of ortho-chlor-para-toluidin sulfo-acid, and allow the solution containing the above diazo compound to flow into a solution of one hundred and fifty (150) parts of beta-naphthol and one hundred and thirty-seven (137) parts of caustic-soda solution, containing thirty-five (35) per cent. of NaOH, to which also excess of calcined soda has been added. After the combination is complete boil the solution, filter off the azo coloring-matter, and wash with cold water.

Our new coloring-matter thus obtained in the form of its sodium salt is a red compound difficultly soluble in hot water, and the free acid itself is practically insoluble in hot water. It is specially suitable for the preparation of lakes, as its salts (and in particular its calcium, barium, aluminium, and lead salts) are characterized by their insolubility even in boiling water and by their brilliant scarlet-red shades, which are fast against the action of acid, alkali, or light. Upon reduction our new compound yields the original ortho-chlor-para-toluidin sulfo-acid again, together with amido-beta-naphthol.

We claim—

The new red azo coloring-matter which can be obtained by combining diazotized ortho-chlor-para-toluidin sulfo-acid with beta-naphthol, which upon reduction yields ortho-chlor-para-toluidin sulfo-acid and amido-beta-naphthol, which in the form of its sodium salt is difficultly soluble in hot water, and in the form of its calcium, barium, aluminium, or lead salt is an insoluble scarlet-red powder.

In testimony whereof we have hereunto set our hands in the presence of two subscribing witnesses.

PAUL JULIUS.
   SIEGFRIED HAECKEL.

Witnesses:
 JACOB ADRIAN,
 ERNEST F. EHRHARDT.